United States Patent
Morita et al.

(10) Patent No.: US 12,292,589 B2
(45) Date of Patent: May 6, 2025

(54) POLARIZED LIGHT-EMITTING FILM CONTAINING WATER-SOLUBLE COUMARIN COMPOUND OR SALT THEREOF, POLARIZED LIGHT-EMITTING PLATE, AND DISPLAY DEVICE

(71) Applicant: Nippon Kayaku Kabushiki Kaisha, Tokyo (JP)

(72) Inventors: Ryoutarou Morita, Tokyo (JP); Noriaki Mochizuki, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 601 days.

(21) Appl. No.: 17/620,801

(22) PCT Filed: Jun. 26, 2020

(86) PCT No.: PCT/JP2020/025321
§ 371 (c)(1),
(2) Date: Dec. 20, 2021

(87) PCT Pub. No.: WO2021/010141
PCT Pub. Date: Jan. 21, 2021

(65) Prior Publication Data
US 2023/0019461 A1   Jan. 19, 2023

(30) Foreign Application Priority Data
Jul. 12, 2019 (JP) .................... 2019-130397

(51) Int. Cl.
G02B 5/30   (2006.01)
C09B 57/02  (2006.01)
(Continued)

(52) U.S. Cl.
CPC ............ G02B 5/3075 (2013.01); C09B 57/02 (2013.01); C09B 67/0097 (2013.01); C09K 11/06 (2013.01); G02F 1/13362 (2013.01)

(58) Field of Classification Search
CPC ....... G02B 5/3075; C09B 57/02; C09K 11/06; G02F 1/13362
(Continued)

(56) References Cited

U.S. PATENT DOCUMENTS 3,617,210 A   11/1971   Dehnert et al.

FOREIGN PATENT DOCUMENTS

| CN | 101906184 A | * 12/2010 |
| JP | 51-45708 B1 | 12/1976 |

(Continued)

OTHER PUBLICATIONS

Translation of 101906184 (Year: 2024).*
International Search Report and Written Opinion mailed Sep. 24, 2020 in corresponding PCT application No. PCT/JP2020/025321.

Primary Examiner — Jerry L Brooks
(74) Attorney, Agent, or Firm — Nields, Lemack & Frame, LLC

(57) ABSTRACT

This polarized light-emitting film contains a water-soluble coumarin compound represented by formula (1) (in formula (1), A represents an optionally substituted coumarin skeleton, X represents a sulfo group or a carboxyl group, and n represents an integer of 1 to 3.) or a salt thereof.

$$[A]—(X)_n \qquad (1)$$

13 Claims, 1 Drawing Sheet

(51) Int. Cl.
*C09B 67/02* (2006.01)
*C09K 11/06* (2006.01)
*G02F 1/13357* (2006.01)

(58) Field of Classification Search
USPC .......................................................... 359/352
See application file for complete search history.

(56) References Cited

FOREIGN PATENT DOCUMENTS

| | | | | | |
|---|---|---|---|---|---|
| JP | 9-87630 | A | | 3/1997 | |
| JP | 9-143383 | A | | 6/1997 | |
| JP | 2001-174636 | A | | 6/2001 | |
| JP | 2001-174809 | A | | 6/2001 | |
| JP | 2003-232919 | A | | 8/2003 | |
| JP | 2004-29121 | A | | 1/2004 | |
| JP | 2006-45314 | A | | 2/2006 | |
| JP | 2007-87995 | A | | 4/2007 | |
| JP | 2008-224854 | A | | 9/2008 | |
| JP | 5713360 | B2 | | 5/2015 | |
| JP | 5849255 | B2 | | 1/2016 | |
| JP | 2017-165896 | A | | 9/2017 | |
| JP | 2020-91477 | A | | 6/2020 | |
| JP | 2020-91478 | A | | 6/2020 | |
| KR | 20150024547 | A | * | 8/2013 | ............... G02B 5/30 |
| KR | 10-2015-0024547 | A | | 3/2015 | |

* cited by examiner

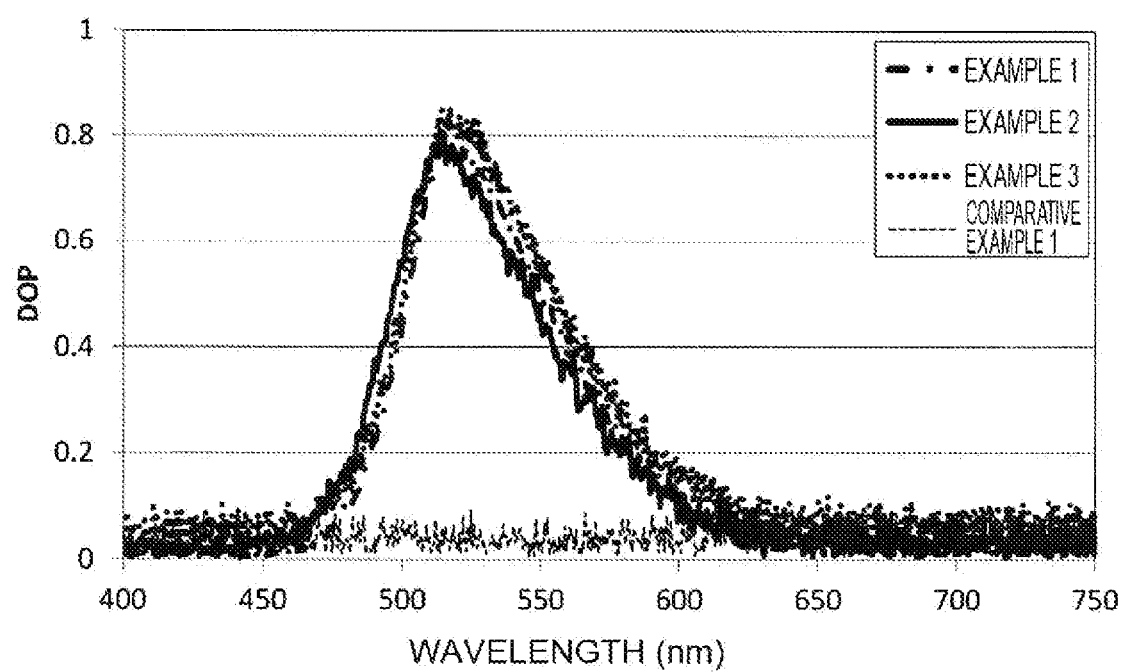

POLARIZED LIGHT-EMITTING FILM CONTAINING WATER-SOLUBLE COUMARIN COMPOUND OR SALT THEREOF, POLARIZED LIGHT-EMITTING PLATE, AND DISPLAY DEVICE

TECHNICAL FIELD

The present invention relates to a novel polarized light-emitting film containing a water-soluble coumarin compound or a salt thereof, and a dye-containing, polarized light-emitting plate and a display device including the same.

BACKGROUND ART

Polarizing plates, which have the function of transmitting and blocking light, as well as liquid crystals, which have the function of switching light, are the basic components of display devices such as liquid crystal displays (LCDs). The fields of application of this LCD are expanding from small devices such as calculators and watches in an early stage to laptop computers, word processors, liquid crystal projectors, liquid crystal televisions, car navigation systems, indoor and outdoor measuring devices, and others. Polarizing plates can also be applied to lenses having a polarizing function, and have been, for example, applied to sunglasses with enhanced visibility, and in recent years, to polarized glasses compatible with 3D televisions and the like. As the applications of polarizing plates have expanded over a wide range, the conditions for use thereof have also broadened into, for example, low to high temperatures, low to high humidity, and low to high light intensity, and therefore, there is a demand for polarizing plates having a high polarizing performance and high durability.

In general, the polarizing film constituting a polarizing plate is produced by stretching and orienting a film of polyvinyl alcohol or a derivative thereof containing iodine or a dichroic dye, or by producing polyene by dehydrochlorination of a polyvinyl chloride film or dehydration of a polyvinyl alcohol film and orienting the polyene. A polarizing plate composed of such a conventional polarizing film contains a dichroic dye that has the effect of absorbing light in the visible light region, and thus has a reduced transmittance in the visible light region. For example, the transmittance in the visible light region of commercially available general polarizing plates is 35 to 45%. When a polarizing plate with low transmittance in the visible light region is used in a display, the overall transmittance of the display is decreased, and thus methods for obtaining polarized light without using a conventional polarizing plate are being studied. As such a method, Patent Documents 1 to 3 disclose techniques for emitting polarized light. However, these techniques are unsuitable for mass production because they use special metals with high scarcity value, such as lanthanide metals like europium (Eu) and terbium (Tb), as materials having the effect of emitting polarized light (hereinafter referred to as "polarized light-emitting effect") and because it is very difficult to produce polarized films. Furthermore, it is difficult to apply them to displays since the emission of polarized light is weak. Therefore, there is a demand for developing a novel material which exhibits a polarized light-emitting effect without using a conventional polarizing plate, has a high transmittance in the visible light region, and can also be applied to liquid crystal displays, and the like, which require durability in harsh environments.

Coumarin compounds are known to emit fluorescent light, and for example, Patent Document 4 discloses that a coumarin compound is used as a fluorescent whitener. In addition, Patent Document 5 discloses that a coumarin compound is used as a dye to be dissolved in liquid crystals for use in guest-host color displays. In addition, Patent Documents 6 and 7 disclose that a coumarin compound is used as a fluorescent dye to be dissolved in liquid crystals. However, these documents all relate to oil-soluble dichroic coumarin compounds which develop dichroism by driving the liquid crystals with a voltage, and do not disclose a water-soluble coumarin compound. Moreover, there were no reports of coumarin compounds applied as dichroic dyes to polarizing films and polarizing plates, or polarized light-emitting films and polarized light-emitting plates.

PRIOR ART DOCUMENTS

Patent Document

Patent Document 1: JP 2008-224854 A
Patent Document 2: Japanese Patent No. 5849255
Patent Document 3: Japanese Patent No. 5713360
Patent Document 4: JP 09-143383 A
Patent Document 5: JP 09-87630 A
Patent Document 6: JP 2004-29121 A
Patent Document 7: JP 2007-87995 A

SUMMARY OF INVENTION

Technical Problem

The object of the present invention is to provide a polarized light-emitting film, a polarized light-emitting plate and a display device having a high transmittance in the visible light region and high durability in a harsh environment.

Solution to Problem

The present inventors have found that a specific water-soluble coumarin compound or a salt thereof exhibits a polarized light-emitting effect in the visible light region when irradiated with light in the ultraviolet to visible light regions, for example, light of 300 to 600 nm. The present inventors have also found that a polarized light-emitting film and a polarized light-emitting plate containing such a compound or a salt thereof exhibits high transmittance in the visible light region while having a polarizing function in the visible light region, and exhibits excellent durability even in harsh environments. The present invention has been completed based on these findings.

Specifically, the present invention provides the following polarized light-emitting film, polarized light-emitting plate, and display device:

[1]
A polarized light-emitting film containing a water-soluble coumarin compound represented by the following formula (1), or a salt thereof:

[Formula 1]

$$[A\!-\!\!-\!(X)_n \qquad (1)$$

wherein A represents a coumarin skeleton optionally having a substituent, X represents a sulfo group or a carboxyl group, and n is an integer from 1 to 3.

[2]
The polarized light-emitting film according to [1], wherein the water-soluble coumarin compound or the salt thereof is a compound represented by the following formula (2), or a salt thereof:

[Formula 2]

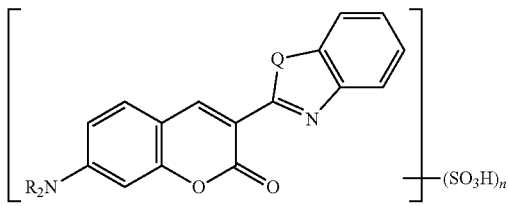

(2)

wherein $R_2$ represents a hydrocarbon group having 1 to 10 carbon atoms, Q represents a sulfur atom, an oxygen atom, or a nitrogen atom, and n is an integer from 1 to 3.

[3]
The polarized light-emitting film according to [1], wherein the water-soluble coumarin compound or the salt thereof is a compound represented by the following formula (3), or a salt thereof:

[Formula 3]

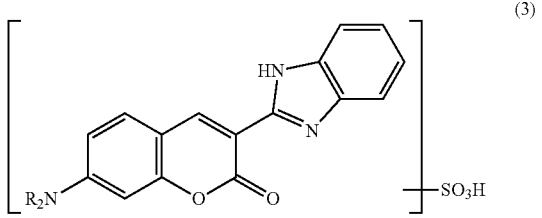

(3)

wherein $R_2$ represents a hydrocarbon group having 1 to 10 carbon atoms.

[4]
The polarized light-emitting film according to any one of [1] to [3], further comprising one or more organic dyes or fluorescent dyes other than the water-soluble coumarin compound or the salt thereof.

[5]
The polarized light-emitting film according to any one of [1] to [4], comprising the water-soluble coumarin compound or the salt thereof and, optionally, the organic dye or fluorescent dye, in a substrate consisting of polyvinyl alcohol resin or a derivative thereof.

[6]
A polarized light-emitting plate comprising the polarized light-emitting film according to any one of [1] to [5] and a transparent protective layer provided on at least one side thereof.

[7]
A display device comprising the polarized light-emitting film according to any one of [1] to [5] or the polarized light-emitting plate according to [6].

The water-soluble coumarin compounds or the salts thereof having the specific structures described above absorb ultraviolet or visible light and use the energy to exhibit a polarized light-emitting effect in the visible light region, and thus the polarized light-emitting films and polarized light-emitting plates produced using these have a polarized light-emitting function in the visible light region. Therefore, it is possible to provide a novel polarized light-emitting film and polarized light-emitting plate having a polarized light-emitting effect in the visible light region without using lanthanide metals with high scarcity value, or the like. The polarized light-emitting film and the polarized light-emitting plate not only exhibit high transmittance in the visible light region, but also exhibit excellent durability against heat and humidity, for example. Therefore, the polarized light-emitting film and the polarized light-emitting plate can be applied to display devices such as liquid crystal displays, which require high transmittance in the visible light region and high durability in harsh environments.

BRIEF DESCRIPTION OF DRAWING

FIG. 1 is a graph showing the DOP values of the measurement samples obtained in Examples 1 to 3 and Comparative Example 1 at each wavelength.

DESCRIPTION OF EMBODIMENTS

The embodiments of the present invention will now be described in detail. However, the present invention is not limited to the embodiments described below.

As used herein, a numerical range expressed using "to" means a range including the numerical values before and after "to" as the lower and upper limits.

Unless otherwise specified, the compounds represented by each formula and the compounds listed as examples of each compound are shown in the form of a free acid (not forming a salt), but the technical scope of the present invention also includes the salts thereof. Unless otherwise specified, to avoid complications, "water-soluble coumarin compound or a salt thereof" may be abbreviated to simply "water-soluble coumarin compound" for convenience.

[Coumarin Compound]

The water-soluble coumarin compound according to the embodiments of the present invention is represented by the above formula (1).

In the above formula (1), A represents a coumarin skeleton optionally having a substituent. Examples of the substituent that the coumarin skeleton optionally has include a heterocyclic amino group, a fused heterocyclic amino group, an alkoxy group, an aryloxy group, an alkylcarbonylamino group, an arylcarbonylamino group, an alkylcarbonyloxy group, an arylcarbonyloxy group, an alkylcarbonyl group, an arylcarbonyl group, an alkylcarbamoyl group, an arylcarbamoyl group, an alkoxycarbonyl group, an aryloxycarbonyl group, an alkylsulfonylamino group, an arylsulfonylamino group, an alkylsulfamoyl group, an arylsulfamoyl group, an alkylsulfonyl group, an arylsulfonyl group, an alkylthio group, an arylthio group, an alkylureido group, an arylureido group, an alkoxycarbonylamino group, an aryloxycarbonylamino group, an alkylamino group, an arylamino group, a hydroxyl group (—OH), a cyano group (—CN), a nitro group (—NO$_2$), a mercapto group (—SH), and a halogen atom.

Examples of the above heterocyclic amino group include a five- or six-membered heterocyclic amino group containing one to three heteroatoms selected from the group consisting of a nitrogen atom, an oxygen atom, and a sulfur atom. Specific examples of such heterocyclic amino group include:

a five-membered heteroalicyclic amino group such as pyrrolidinylamino, tetrahydrofurylamino, tetrahydrothiophen-2-ylamino, and tetrahydrothiophen-3-ylamino;

a six-membered heteroalicyclic amino group such as piperidinylamino, piperazinylamino, dioxan-2-ylamino, morpholinylamino, and thiomorpholinylamino;

a five-membered aromatic heterocyclic amino group such as pyrroleamino, pyrazoleamino, imidazoleamino, triazoleamino, furylamino, thiophen-2-ylamino, thiophen-3-ylamino, oxazoleamino, and thiazoleamino; and a six-membered aromatic heterocyclic amino group such as pyridylamino, pyrazylamino, pyridazinylamino, and triazinylamino.

In the heterocyclic group, it is preferable that the heterocyclic moiety be an aromatic ring. It is preferable that the heteroatom constituting the heterocycle be selected from a nitrogen atom and a sulfur atom.

Examples of the above fused heterocyclic amino group include a fused heterocyclic amino group in which one benzene ring is fused to a five- or six-membered heterocyclic group containing one to three heteroatoms selected from the group consisting of a nitrogen atom, an oxygen atom, and a sulfur atom. Specific examples of such fused heterocyclic amino group include:

a fused heteroalicyclic amino group in which the heterocyclic moiety is an alicyclic five-membered ring, such as phthalanylamino;

a fused heteroalicyclic amino group in which the heterocyclic moiety is an alicyclic six-membered ring, such as benzopyranylamino;

a fused aromatic heterocyclic amino group in which the heterocyclic moiety is an aromatic five-membered ring, such as benzopyrrolamino, benzopyrazolamino, benzimidazolamino, benzotriazolamino, benzofuranylamino, benzothiophen-2-ylamino, benzothiophen-3-ylamino, benzoxazoleamino, and benzothiazoleamino; and a fused aromatic heterocyclic amino group in which the heterocyclic moiety is an aromatic six-membered ring, such as quinolinylamino, cinnolinylamino, phthalazinylamino, quinazolinylamino, and quinoxalinylamino.

In the heterocyclic group, it is preferable that the heterocyclic moiety be an aromatic ring. It is preferable that the heteroatom constituting the heterocycle be selected from a nitrogen atom and a sulfur atom.

Examples of the above alkoxy group include a linear, branched, or cyclic alkoxy group, preferably a $C_1$-$C_{10}$ alkoxy group. Specific examples of the $C_1$-$C_{10}$ alkoxy group include:

a linear $C_1$-$C_{10}$ alkoxy group such as methoxy, ethoxy, n-propoxy, n-butoxy, n-pentoxy, n-hexyloxy, n-heptoxy, n-octyloxy, n-nonyloxy, and n-decyloxy:

a branched $C_3$-$C_{10}$ alkoxy group such as isopropoxy, isobutoxy, sec-butoxy, t-butoxy, isoamyloxy, t-amyloxy, isohexyloxy, t-hexyloxy, isoheptoxy, t-heptoxy, isooctyloxy, t-octyloxy, 2-ethylhexyloxy, isononyloxy, and isodecyloxy; and a cyclic $C_3$-$C_7$ alkoxy group such as cyclopropoxy, cyclobutoxy, cyclopentoxy, cyclohexyloxy, and cycloheptoxy. Among these, a linear or branched alkoxy group is preferable.

The above aryloxy group is preferably a $C_6$-$C_{12}$ aryloxy group, and specific examples thereof include phenoxy, naphthyloxy, and biphenyloxy.

Examples of the above alkylcarbonylamino group include a linear, branched, or cyclic alkylcarbonylamino group, preferably a $C_1$-$C_{10}$ alkylcarbonylamino group. Specific examples of the $C_1$-$C_{10}$ alkylcarbonylamino group include:

a linear $C_1$-$C_{10}$ alkylcarbonylamino group such as methylcarbonylamino, ethylcarbonylamino, n-propylcarbonylamino, n-butylcarbonylamino, n-pentylcarbonylamino, n-hexylcarbonylamino, n-heptylcarbonylamino, n-octylcarbonylamino, n-nonylcarbonylamino, and n-decylcarbonylamino;

a branched $C_3$-$C_{10}$ alkylcarbonylamino group such as isopropylcarbonylamino, isobutylcarbonylamino, sec-butylcarbonylamino, t-butylcarbonylamino, isoamylcarbonylamino, t-amylcarbonylamino, isohexylcarbonylamino, t-hexylcarbonylamino, isoheptylcarbonylamino, t-heptylcarbonylamino, isooctylcarbonylamino, t-octylcarbonylamino, 2-ethylhexylcarbonylamino, isononylcarbonylamino, and isodecylcarbonylamino; and a cyclic $C_3$-$C_7$ alkylcarbonylamino group such as cyclopropylcarbonylamino, cyclobutylcarbonylamino, cyclopentylcarbonylamino, cyclohexylcarbonylamino, and cycloheptylcarbonylamino. Among these, a linear or branched alkylcarbonylamino group is preferable, and a linear alkylcarbonylamino group is more preferable.

The above arylcarbonylamino group is preferably a $C_6$-$C_{12}$ arylcarbonylamino group, and specific examples thereof include phenylcarbonylamino, naphthylcarbonylamino, and biphenylcarbonylamino.

Examples of the above alkylcarbonyloxy group include a linear, branched, or cyclic alkylcarbonyloxy group, preferably a $C_1$-$C_{10}$ alkylcarbonyloxy group. Specific examples of the $C_1$-$C_{10}$ alkylcarbonyloxy group include:

a linear $C_1$-$C_{10}$ alkylcarbonyloxy group such as methylcarbonyloxy, ethylcarbonyloxy, n-propylcarbonyloxy, n-butylcarbonyloxy, n-pentylcarbonyloxy, n-hexylcarbonyloxy, n-heptylcarbonyloxy, n-octylcarbonyloxy, n-nonylcarbonyloxy, and n-decylcarbonyloxy;

a branched $C_3$-$C_{10}$ alkylcarbonyloxy group such as isopropylcarbonyloxy, isobutylcarbonyloxy, sec-butylcarbonyloxy, t-butylcarbonyloxy, isoamylcarbonyloxy, t-amylcarbonyloxy, isohexylcarbonyloxy, t-hexylcarbonyloxy, isoheptylcarbonyloxy, t-heptylcarbonyloxy, isooctylcarbonyloxy, t-octylcarbonyloxy, 2-ethylhexylcarbonyloxy, isononylcarbonyloxy, and isodecylcarbonyloxy; and a cyclic $C_3$-$C_7$ alkylcarbonyloxy group such as cyclopropylcarbonyloxy, cyclobutylcarbonyloxy, cyclopentylcarbonyloxy, cyclohexylcarbonyloxy, and cycloheptylcarbonyloxy. Among these, a linear or branched alkylcarbonyloxy group is preferable, and a linear alkylcarbonyloxy group is more preferable.

The above arylcarbonyloxy group is preferably a $C_6$-$C_{12}$ arylcarbonyloxy group, and specific examples thereof include phenylcarbonyloxy, naphthylcarbonyloxy, and biphenylcarbonyloxy.

Examples of the above alkylcarbonyl group include a linear, branched, or cyclic alkylcarbonyl group, preferably a $C_1$-$C_{10}$ alkylcarbonyl group. Specific examples of the $C_1$-$C_{10}$ alkylcarbonyl group include:

a linear $C_1$-$C_{10}$ alkylcarbonyl group such as methylcarbonyl, ethylcarbonyl, n-propylcarbonyl, n-butylcarbonyl, n-pentylcarbonyl, n-hexylcarbonyl, n-heptylcarbonyl, n-octylcarbonyl, n-nonylcarbonyl, and n-decylcarbonyl;

a branched $C_3$-$C_{10}$ alkylcarbonyl group such as isopropylcarbonyl, isobutylcarbonyl, sec-butylcarbonyl, t-butylcarbonyl, isoamilcarbonyl, t-amylcarbonyl, isohexylcarbonyl, t-hexylcarbonyl, isoheptylcarbonyl, t-heptylcarbonyl, isooctylcarbonyl, t-octylcarbonyl, 2-ethylhexylcarbonyl, isononylcarbonyl, and isodecylcarbonyl; and a cyclic $C_3$-$C_7$ alkylcarbonyl group such as cyclopropylcarbonyl, cyclobutylcarbonyl, cyclopentylcarbonyl, cyclohexylcarbonyl, and cycloheptylcarbonyl. Among these, a linear or branched alkylcarbonyl group is preferable, and a linear alkylcarbonyl group is more preferable.

The above arylcarbonyl group is preferably a $C_6$-$C_{12}$ arylcarbonyl group, and specific examples thereof include phenylcarbonyl (benzoyl), naphthylcarbonyl, and biphenylcarbonyl.

Examples of the above alkylcarbamoyl group include a linear, branched, or cyclic monoalkylcarbamoyl group or dialkylcarbamoyl group. The monoalkylcarbamoyl group is preferably a mono-$C_1$-$C_{10}$ alkylcarbamoyl group, and specific examples thereof include:

a linear mono-$C_1$-$C_{10}$ alkylcarbamoyl group such as methylcarbamoyl, ethylcarbamoyl, n-propylcarbamoyl, n-butylcarbamoyl, n-pentylcarbamoyl, n-hexylcarbamoyl, n-heptylcarbamoyl, n-octylcarbamoyl, n-nonylcarbamoyl, and n-decylcarbamoyl;

a branched mono-$C_3$-$C_{10}$ alkylcarbamoyl group such as isopropylcarbamoyl, isobutylcarbamoyl, sec-butylcarbamoyl, t-butylcarbamoyl, isoamylcarbamoyl, t-amylcarbamoyl, isohexylcarbamoyl, t-hexylcarbamoyl, isoheptylcarbamoyl, t-heptylcarbamoyl, isooctylcarbamoyl, t-octylcarbamoyl, 2-ethylhexylcarbamoyl, isononylcarbamoyl, and isodecylcarbamoyl; and a cyclic mono-$C_3$-$C_7$ alkylcarbamoyl group such as cyclopropylcarbamoyl, cyclobutylcarbamoyl, cyclopentylcarbamoyl, cyclohexylcarbamoyl, and cycloheptylcarbamoyl. Among these, a linear or branched monoalkylcarbamoyl group is preferable, and a linear monoalkylcarbamoyl group is more preferable.

The dialkylcarbamoyl group is preferably a di-$C_1$-$C_{10}$ alkylcarbamoyl group, and specific examples thereof include:

a di-$C_1$-$C_{10}$ alkylcarbamoyl group having two linear alkyl groups, such as dimethylcarbamoyl, diethylcarbamoyl, di-n-propylcarbamoyl, di-n-butylcarbamoyl, di-n-pentylcarbamoyl, di-n-hexylcarbamoyl, di-n-heptylcarbamoyl, di-n-octylcarbamoyl, di-n-nonylcarbamoyl, and di-n-decylcarbamoyl;

a di-$C_3$-$C_{10}$ alkylcarbamoyl group having two branched alkyl groups, such as diisopropylcarbamoyl, diisobutylcarbamoyl, di-sec-butylcarbamoyl, di-t-butylcarbamoyl, diisoamylcarbamoyl, di-t-amylcarbamoyl, diisoheylcarbamoyl, di-t-hexylcarbamoyl, diisoheptylcarbamoyl, di-t-heptylcarbamoyl, diisooctylcarbamoyl, di-t-octylcarbamoyl, di-(2-ethylhexyl)carbamoyl, diisononylcarbamoyl, and diisodecylcarbamoyl; and a di-$C_3$-$C_7$ alkylcarbamoyl group having two cyclic alkyl groups, such as dicyclopropylcarbamoyl, dicyclobutylcarbamoyl, dicyclopentylcarbamoyl, dicyclohexylcarbamoyl, and dicycloheptylcarbamoyl. Among these, a linear or branched dialkylcarbamoyl group is preferable, and a linear dialkylcarbamoyl group is more preferable.

Examples of the above arylcarbamoyl group include a monoarylcarbamoyl group and a diarylcarbamoyl group. The monoarylcarbamoyl group is preferably a mono-$C_6$-$C_{12}$ arylcarbamoyl group, and specific examples thereof include phenylcarbamoyl, naphthylcarbamoyl, and biphenylcarbamoyl.

The diarylcarbamoyl group is preferably a di-$C_6$-$C_{12}$ arylcarbamoyl group, and specific examples thereof include diphenylcarbamoyl, dinaphthylcarbamoyl, and di(biphenyl) carbamoyl.

Examples of the above alkoxycarbonyl group include a linear, branched, or cyclic alkoxycarbonyl group, preferably a $C_1$-$C_{10}$ alkoxycarbonyl group. Specific examples of the $C_1$-$C_{10}$ alkoxycarbonyl group include:

a linear $C_1$-$C_{10}$ alkoxycarbonyl group such as methoxycarbonyl, ethoxycarbonyl, n-propoxycarbonyl, n-butoxycarbonyl, n-pentoxycarbonyl, n-hexyloxycarbonyl, n-heptoxycarbonyl, n-octyloxycarbonyl, n-nonyloxycarbonyl, and n-decyloxycarbonyl:

a branched $C_3$-$C_{10}$ alkoxycarbonyl group such as isopropoxycarbonyl, isobutoxycarbonyl, sec-butoxycarbonyl, t-butoxycarbonyl, isoamyloxycarbonyl, t-amyloxycarbonyl, isohexyloxycarbonyl, t-hexyloxycarbonyl, isoheptoxycarbonyl, t-heptoxycarbonyl, isooctyloxycarbonyl, t-octyloxycarbonyl, 2-ethylhexyloxycarbonyl, isononyloxycarbonyl, and isodecyloxycarbonyl; and a cyclic $C_3$-$C_7$ alkoxycarbonyl group such as cyclopropoxycarbonyl, cyclobutoxycarbonyl, cyclopentoxycarbonyl, cyclohexyloxycarbonyl, and cycloheptoxycarbonyl. Among these, a linear or branched alkoxycarbonyl group is preferable, and a linear alkoxycarbonyl group is more preferable.

The above aryloxycarbonyl group is preferably a $C_6$-$C_{12}$ aryloxycarbonyl group, and specific examples thereof include phenoxycarbonyl, naphthyloxycarbonyl, and biphenyloxycarbonyl.

Examples of the above alkylsulfonylamino group include a linear, branched, or cyclic alkylsulfonylamino group, preferably a $C_1$-$C_{10}$ alkylsulfonylamino group. Specific examples of the $C_1$-$C_{10}$ alkylsulfonylamino group include:

a linear $C_1$-$C_{10}$ alkylsulfonylamino group such as methylsulfonylamino, ethylsulfonylamino, n-propylsulfonylamino, n-butylsulfonylamino, n-pentylsulfonylamino, n-hexylsulfonylamino, n-heptylsulfonylamino, n-octylsulfonylamino, n-nonylsulfonylamino, and n-decylsulfonylamino;

a branched $C_3$-$C_{10}$ alkylsulfonylamino group such as isopropylsulfonylamino, isobutylsulfonylamino, sec-butylsulfonylamino, t-butylsulfonylamino, isoamylsulfonylamino, t-amylsulfonylamino, isohexylsulfonylamino, t-hexylsulfonylamino, isoheptylsulfonylamino, t-heptylsulfonylamino, isooctylsulfonylamino, t-octylsulfonylamino, 2-ethylhexylsulfonylamino, isononylsulfonylamino, and isodecylsulfonylamino; and a cyclic $C_3$-$C_7$ alkylsulfonylamino group such as cyclopropylsulfonylamino, cyclobutylsulfonylamino, cyclopentylsulfonylamino, cyclohexylsulfonylamino, and cycloheptylsulfonylamino. Among these, a linear or branched alkylsulfonylanino group is preferable, and a linear alkylsulfonylamino group is more preferable.

The above arylsulfonylamino group is preferably a $C_6$-$C_{12}$ arylsulfonylamino group, and specific examples thereof include phenylsulfonylamino, toluenesulfonylamino, naphthylsulfonylamino, and biphenylsulfonylamino.

Examples of the above alkylsulfamoyl group include a linear, branched, or cyclic monoalkylsulfamoyl group or dialkylsulfamoyl group. The monoalkylsulfamoyl group is preferably a mono-$C_1$-$C_{10}$ alkylsulfamoyl group, and specific examples thereof include:

a linear mono-$C_1$-$C_{10}$ alkylsulfamoyl group such as methylsulfamoyl, ethylsulfamoyl, n-propylsulfamoyl, n-butylsulfamoyl, n-pentylsulfamoyl, n-hexylsulfamoyl, n-heptylsulfamoyl, n-octylsulfamoyl, n-nonylsulfamoyl, and n-decylsulfamoyl;

a branched mono-$C_3$-$C_{10}$ alkylsulfamoyl group such as isopropylsulfamoyl, isobutylsulfamoyl, sec-butylsulfamoyl, t-butylsulfamoyl, isoamylsulfamoyl, t-amylsulfamoyl, isohexylsulfamoyl, t-hexylsulfamoyl, isoheptylsulfamoyl, t-heptylsulfamoyl, isooctylsulfamoyl, t-octylsulfamoyl, 2-ethylhexylsulfamoyl, isononylsulfamoyl, and isodecylsulfamoyl; and a cyclic mono-$C_3$-$C_7$ alkylsulfamoyl group such as cyclopropylsulfamoyl, cyclobutylsulfamoyl, cyclopentylsulfamoyl, cyclohexylsulfamoyl, and cycloheptylsulfamoyl. Among these, a linear or branched monoalkylsulfamoyl group is preferable, and a linear monoalkylsulfamoyl group is more preferable.

The dialkylsulfamoyl group is preferably a di-$C_1$-$C_{10}$ alkylsulfamoyl group, and specific examples thereof include:

a di-$C_1$-$C_{10}$ alkylsulfamoyl group having two linear alkyl groups, such as dimethylsulfamoyl, diethylsulfamoyl, di-n-propylsulfamoyl, di-n-butylsulfamoyl, di-n-pentylsulfamoyl, di-n-hexylsulfamoyl, di-n-heptylsulfamoyl, di-n-octylsulfamoyl, di-n-nonylsulfamoyl, and di-n-decylsulfamoyl;

a di-$C_3$-$C_{10}$ alkylsulfamoyl group having two branched alkyl groups, such as diisopropylsulfamoyl, diisobutylsulfamoyl, di-sec-butylsulfamoyl, di-t-butylsulfamoyl, diisoamylsulfamoyl, di-t-amylsulfamoyl, diisohexylsulfamoyl, di-t-hexylsulfamoyl, diisoheptylsulfamoyl, di-t-heptylsulfamoyl, diisooctylsulfamoyl, di-t-octylsulfamoyl, di-(2-ethylhexyl)sulfamoyl, diisononylsulfamoyl, and diisodecylsulfamoyl; and a di-$C_3$-$C_7$ alkylsulfamoyl group having two cyclic alkyl groups, such as dicyclopropylsulfamoyl, dicyclobutylsulfamoyl, dicyclopentylsulfamoyl, dicyclohexylsulfamoyl, and dicycloheptylsulfamoyl. Among these, a linear or branched dialkylsulfamoyl group is preferable, and a linear dialkylsulfamoyl group is more preferable.

Examples of the above arylsulfamoyl group include a monoarylsulfamoyl group and a diarylsulfamoyl group. The monoarylsulfamoyl group is preferably a mono-$C_6$-$C_2$ arylsulfamoyl group, and specific examples thereof include phenylsulfamoyl, naphthylsulfamoyl, and biphenylsulfamoyl.

The diarylsulfamoyl group is preferably a di-$C_6$-$C_{12}$ arylsulfamoyl group, and specific examples thereof include diphenylsulfamoyl, dinaphthylsulfamoyl, and di(biphenyl)sulfamoyl.

Examples of the above alkylsulfonyl group include a linear, branched, or cyclic alkylsulfonyl group, preferably a $C_1$-$C_{12}$ alkylsulfonyl group. Specific examples of the $C_1$-$C_{12}$ alkylsulfonyl group include:

a linear $C_1$-$C_{12}$ alkylsulfonyl group such as methylsulfonyl, ethylsulfonyl, n-propylsulfonyl, n-butylsulfonyl, n-pentylsulfonyl, n-hexylsulfonyl, n-heptylsulfonyl, n-octylsulfonyl, n-nonylsulfonyl, n-decylsulfonyl, n-undecylsulfonyl, and n-dodecylsulfonyl;

a branched $C_3$-$C_{12}$ alkylsulfonyl group such as isopropylsulfonyl, isobutylsulfonyl, sec-butylsulfonyl, t-butylsulfonyl, isoamylsulfonyl, t-amylsulfonyl, isohexylsulfonyl, t-hexylsulfonyl, isoheptylsulfonyl, t-heptylsulfonyl, isooctylsulfonyl, t-octylsulfonyl, 2-ethylhexylsulfonyl, isononylsulfonyl, isodecylsulfonyl, isoundecylsulfonyl, t-undecylsulfonyl, isododecylsulfonyl, and t-dodecylsulfonyl; and a cyclic $C_3$-$C_7$ alkylsulfonyl group such as cyclopropylsulfonyl, cyclobutylsulfonyl, cyclopentylsulfonyl, cyclohexylsulfonyl, and cycloheptylsulfonyl. Among these, a linear or branched alkylsulfonyl group is preferable, and a linear alkylsulfonyl group is more preferable.

The above arylsulfonyl group is preferably a $C_6$-$C_{12}$ arylsulfonyl group, and specific examples thereof include phenylsulfonyl, naphthylsulfonyl, and biphenylsulfonyl.

Examples of the above alkylthio group include a linear, branched, or cyclic alkylthio group, preferably a $C_1$-$C_{10}$ alkylthio group. Specific examples of the $C_1$-$C_{10}$ alkylthio group include:

a linear $C_1$-$C_{10}$ alkylthio group such as methylthio, ethylthio, n-propylthio, n-butylthio, n-pentylthio, n-hexylthio, n-heptylthio, n-octylthio, n-nonylthio, and n-decylthio:

a branched $C_3$-$C_{10}$ alkylthio group such as isopropylthio, isobutylthio, sec-butylthio, t-butylthio, isoamylthio, t-amylthio, isohexylthio, t-hexylthio, isoheptylthio, t-heptylthio, isooctylthio, t-octylthio, 2-ethylhexylthio, isononylthio, and isodecylthio; and a cyclic $C_3$-$C_7$ alkylthio group such as cyclopropylthio, cyclobutylthio, cyclopentylthio, cyclohexylthio, and cycloheptylthio. Among these, a linear or branched alkylthio group is preferable, and a linear alkylthio group is more preferable.

The above arylthio group is preferably a $C_6$-$C_{12}$ arylthio group, and specific examples thereof include phenylthio, naphthylthio, and biphenylthio.

Examples of the above alkylureido group include a linear, branched, or cyclic monoalkylureido group or dialkylureido group. The monoalkylureido group is preferably a mono-$C_1$-$C_{10}$ alkylureido group, and specific examples thereof include:

a linear mono-$C_1$-$C_{10}$ alkylureido group such as methylureido, ethylureido, n-propylureido, n-butylureido, n-pentylureido, n-hexylureido, n-heptylureido, n-octylureido, n-nonylureido, and n-decylureido;

a branched mono-$C_3$-$C_{10}$ alkylureido group such as isopropylureido, isobutylureido, sec-butylureido, t-butylureido, isoamylureido, t-amylureido, isohexylureido, t-hexylureido, isoheptylureido, t-heptylureido, isooctylureido, t-octylureido, 2-ethylhexylureido, isononylureido, and isodecylureido; and a cyclic mono-$C_3$-$C_7$ alkylureido group such as cyclopropylureido, cyclobutylureido, cyclopentylureido, cyclohexylureido, and cycloheptylureido. Among these, a linear or branched alkylureido group is preferable, and a linear alkylureido group is included.

The dialkylureido group is preferably a di-$C_1$-$C_{10}$ alkylureido group, and specific examples thereof include:

a di-$C_1$-$C_{10}$ alkylureido group having two linear alkyl groups, such as dimethylureido, diethylureido, di-n-propylureido, di-n-butylureido, di-n-pentylureido, di-n-hexylureido, di-n-heptylureido, di-n-octylureido, di-n-nonylureido, and di-n-decylureido;

a di-$C_3$-$C_{10}$ alkylureido group having two branched alkyl groups, such as diisopropylureido, diisobutylureido, di-sec-butylureido, di-t-butylureido, di-isoamylureido, di-t-amylureido, diisohexylureido, di-t-hexylureido, diisoheptylureido, di-t-heptylureido, diisooctylureido, di-t-octylureido, di-(2-ethylhexyl)ureido, diisononylureido, and diisodecylureido; and a cyclic di-$C_3$-$C_7$ alkylureido group having two rings, such as dicyclopropylureido, dicyclobutylureido, dicyclopentylureido, dicyclohexylureido, and dicycloheptylureido. Among these, a linear or branched dialkylureido group is preferable, and a linear dialkylureido group is more preferable.

Examples of the above arylureido group include a monoarylureido group and a diarylureido group. The above arylureido group is preferably a mono-$C_6$-$C_{12}$ arylureido group, and specific examples thereof include phenylureido, naphthylureido, and biphenylureido.

The diarylureido group is preferably a di-$C_6$-$C_{12}$ arylureido group, and specific examples thereof include diphenylureido, dinaphthylureido, and di(biphenyl)ureido.

Examples of the above alkoxycarbonylamino group include a linear, branched, or cyclic alkoxycarbonylamino group, preferably a $C_1$-$C_{10}$ alkoxycarbonylamino group. Specific examples of the $C_1$-$C_{10}$ alkoxycarbonylamino group include:

a linear $C_1$-$C_{10}$ alkoxycarbonylamino group such as methoxycarbonylamino, ethoxycarbonylamino, n-propoxycarbonylamino, n-butoxycarbonylamino, n-pentoxycarbonylamino, n-hexyloxycarbonylamino, n-heptoxycarbonylamino, n-octyloxycarbonylamino, n-nonyloxycarbonylamino, and n-decyloxycarbonylamino;

a branched $C_3$-$C_{10}$ alkoxycarbonylamino group such as isopropoxycarbonylamino, isobutoxycarbonylamino, sec-butoxycarbonylamino, t-butoxycarbonylamino, isoamyloxycarbonylamino, t-amyloxycarbonylamino, isohexyloxycarbonylamino, t-hexyloxycarbonylamino, isoheptoxycarbonylamino, t-heptoxycarbonylamino, isooctyloxycarbonylamino, t-octyloxycarbonylamino, 2-ethylhexyloxycarbonylamino, isononyloxycarbonylamino, and isodecyloxycarbonylamino; and a cyclic $C_3$-$C_7$ alkoxycarbonylamino group such as cyclopropoxycarbonylamino, cyclobutoxycarbonylamino, cyclopentoxycarbonylamino, cyclohexyloxycarbonylamino, and cycloheptoxycarbonylamino. Among these, a linear or branched alkoxycarbonylamino group is preferable, and a linear alkoxycarbonylamino group is more preferable.

The above aryloxycarbonylamino group is preferably a $C_6$-$C_{12}$ aryloxycarbonylamino group, and specific examples thereof include phenylcarbonylamino, naphthylcarbonylamino, and biphenylcarbonylamino.

Examples of the above alkylamino group include a linear, branched, or cyclic monoalkylamino group or dialkylamino group. The monoalkylamino group is preferably a mono-$C_1$-$C_{10}$ alkylamino group, and specific examples thereof include:

a linear mono-$C_1$-$C_{10}$ alkylamino group such as methylamino, ethylamino, n-propylamino, n-butylamino, n-pentylamino, n-hexylamino, n-heptylamino, n-octylamino, n-nonylamino, and n-decylamino;

a branched mono-$C_3$-$C_{10}$ alkylamino group such as isopropylamino, isobutylamino, sec-butylamino, t-butylamino, isoamylamino, t-amylamino, isohexylamino, t-hexylamino, isoheptylamino, t-heptylamino, isooctylamino, t-octylamino, 2-ethylhexylamino, isononylamino, and isodecylamino; and a cyclic mono-$C_3$-$C_7$ alkylamino group such as cyclopropylamino, cyclobutylamino, cyclopentylamino, cyclohexylamino, and cycloheptylamino. Among these, a linear or branched monoalkylamino group is preferable, and a linear monoalkylamino group is more preferable.

The dialkylamino group is preferably a di-$C_1$-$C_{10}$ alkylamino group, and specific examples thereof include:

a di-$C_1$-$C_{10}$ alkylamino group having two linear alkyl groups such as dimethylamino, diethylamino, di-n-propylamino, di-n-butylamino, di-n-pentylamino, di-n-hexylamino, di-n-heptylamino, di-n-octylamino, di-n-nonylamino, and di-n-decylamino;

a di-$C_3$-$C_{10}$ alkylamino group having two branched alkyl groups such as diisopropylamino, diisobutylamino, di-sec-butylamino, di-t-butylamino, diisoamylamino, di-t-amylamino, diisohexylamino, di-t-hexylamino, diisoheptylamino, di-t-heptylamino, diisooctylamino, di-t-octylamino, di-(2-ethylhexyl)amino, diisononylamino, and diisodecylamino; and a di-$C_3$-$C_7$ alkylamino group having two cyclic alkyl groups such as dicyclopropylamino, dicyclobutylamino, dicyclopentylamino, dicyclohexylamino, and dicycloheptylamino. Among these, a linear or branched dialkylamino group is preferable, and a linear dialkylamino group is more preferable.

Examples of the above arylamino group include a monoarylamino group and a diarylamino group. The monoarylamino group is preferably a mono-$C_6$-$C_{12}$ arylamino group, and specific examples thereof include phenylamino (anilino), naphthylamino, and biphenylamino.

The diarylamino group is preferably a di-$C_6$-$C_{12}$ arylamino group, and specific examples thereof include diphenylamino, dinaphthylamino, and di(biphenyl)amino.

Examples of the above halogen atom include a fluorine atom, a chlorine atom, and an iodine atom, and preferably a fluorine atom, a chlorine atom or a bromine atom.

In the formula (1), X represents a sulfo group or a carboxyl group, and is preferably a sulfo group, n represents an integer from 1 to 3, and is preferably 1.

The sulfo group or the carboxyl group can be attached, if chemically possible, to any part of the coumarin skeleton, which optionally has a substituent indicated by A, and the resulting compound exhibits the desired polarized light-emitting effect regardless of the position of the sulfo group or the carboxyl group attached. However, in many cases, it is attached to the substituents of the coumarin skeleton described above.

The water-soluble coumarin compound represented by the above formula (1) or a salt thereof is preferably a compound represented by the above formula (2) or a salt thereof.

In the above formula (2), $R_2$ represents a hydrocarbon group having 1 to 10 carbon atoms, Q represents a sulfur atom, an oxygen atom, or a nitrogen atom, and n is an integer from 1 to 3.

Examples of the above hydrocarbon group having 1 to 10 carbon atoms include a linear hydrocarbon group such as a methyl group, an ethyl group, an n-butyl group, and an n-octyl group, a branched hydrocarbon group such as an iso-butyl group and a tert-butyl group, and a cyclic hydrocarbon group such as a cyclohexyl group and a cycloheptyl group. Q is preferably selected from a nitrogen atom and a sulfur atom, n is preferably 1.

The sulfo group can be attached to any part of the coumarin skeleton and the fused heterocyclic ring attached to it, if chemically possible, and the resulting compound exhibits the desired polarized light-emitting effect regardless of the position of the sulfo group attached. However, in many cases, the hydrogen atoms of the benzene ring of the fused heterocyclic ring attached to the coumarin skeleton are substituted. The preferred position of the substitution is position 5 or 6 when Q and N are at position 1 and position 3, respectively, in the benzo fused heterocyclic ring.

The water-soluble coumarin compound represented by the above formula (1) is still more preferably a compound represented by the above formula (3) or a salt thereof.

In the formula (3), $R_2$, represents a hydrocarbon group having 1 to 10 carbon atoms. The hydrocarbon group having 1 to 10 carbon atoms can be the same as that described in the section on the formula (2).

The sulfo group can be attached to any part of the coumarin skeleton and the benzimidazole ring attached to it, if chemically possible, and the resulting compound exhibits the desired polarized light-emitting effect regardless of the position of the sulfo group attached. However, in many cases, the hydrogen atoms of the benzene ring in the benzimidazole ring are substituted. The preferred position of the substitution is position 5 or 6 when NH and N are at position 1 and position 3, respectively, in the benzimidazole ring.

The salt of the water-soluble coumarin compound represented by the above formulas (1) to (3) means a state in which the free acid of the water-soluble coumarin compound represented by the above formulas (1) to (3) forms a salt with an inorganic or organic cation. Examples of the inorganic cation include a cation of an alkali metal, such as lithium, sodium, and potassium, or ammonium ($NH_4^+$). Examples of the organic cation include the organic ammonium represented by the following formula (4):

[Formula 4]

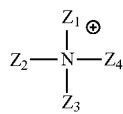

(4)

wherein $Z_1$ to $Z_4$ each independently represent a hydrogen atom, an alkyl group, a hydroxyalkyl group, or a hydroxyalkoxyalkyl group, and at least one of $Z_1$ to $Z_4$ is a group other than a hydrogen atom.

In the formula (4), specific examples of $Z_1$ to $Z_4$ include:

a $C_1$-$C_6$ alkyl group such as methyl, ethyl, butyl, pentyl, and hexyl, preferably a $C_1$-$C_4$ alkyl group;

a hydroxy $C_1$-$C_6$ alkyl group such as hydroxymethyl, 2-hydroxyethyl, 3-hydroxypropyl, 2-hydroxypropyl, 4-hydroxybutyl, 3-hydroxybutyl, and 2-hydroxybutyl, preferably a hydroxy $C_1$-$C_4$ alkyl group; and a hydroxy $C_1$-$C_6$ alkoxy $C_1$-$C_6$ alkyl group such as hydroxyethoxymethyl, 2-hydroxyethoxyethyl, 3-hydroxyethoxypropyl, 3-hydroxyethoxybutyl, and 2-hydroxyethoxybutyl, preferably a hydroxy $C_1$-$C_4$ alkoxy $C_1$-$C_4$ alkyl group.

Among these inorganic and organic cations, the cations of sodium, potassium, lithium, monoethanolamine, diethanolamine, triethanolamine, monoisopropanolamine, diisopropanolamine, triisopropanolamine, ammonium, and the like are more preferable, and the inorganic cations of lithium, ammonium, and sodium are particularly preferable.

As described above, the water-soluble coumarin compound represented by the formulas (1) to (3) according to the embodiments of the present invention has at least one coumarin skeleton in the molecule and does not have azo bonds. Since the water-soluble coumarin compound has a coumarin skeleton, it exhibits a light-emitting effect when irradiated with ultraviolet and visible light, particularly light of 300 to 600 nm. On the other hand, the water-soluble coumarin compound does not have azo bonds in the molecule, and therefore the absorption of light caused by the azo bonds is inhibited. Due to this specific structure, these water-soluble coumarin compounds can absorb ultraviolet and visible light and use the energy thereof to exhibit the effect of emitting polarized light in the visible light region, as well as to provide a high transmittance in the visible light region.

Next, a method for synthesizing the above-mentioned water-soluble coumarin compound will be described. Although the method for synthesizing is not particularly limited, the water-soluble coumarin compound represented by the formulas (1) to (3) can be synthesized by carrying out the following synthetic reaction, for example.

The water-soluble coumarin compound represented by the above formulas (1) to (3), or a salt thereof, can be produced according to known methods for sulfonation or carboxylation. For example, a coumarin compound is reacted with fuming sulfuric acid, water or saline is added to the resulting reaction solution, and the precipitated solid is separated by filtration or the like. Then, the separated solid is washed and dried, as necessary. In this way, the water-soluble coumarin compound represented by the formulas (1) to (3) or a salt thereof can be synthesized. The compound used for the sulfonation or carboxylation is a non-water-soluble coumarin compound that has a coumarin skeleton and can have the substituents described above. A commercially available compound may be used as the compound used for the sulfonation or carboxylation, or it may be synthesized according to a known method.

[Polarized Light-Emitting Film]

The polarized light-emitting film containing the water-soluble coumarin compound represented by the above formulas (1) to (3), or a salt thereof, is also included in the present invention.

In a preferred embodiment of the present invention, the polarized light-emitting film comprises a substrate containing the water-soluble coumarin compound represented by any of the above formulas (1) to (3), or a salt thereof. Such a substrate is preferably a film or the like made of a hydrophilic polymer capable of adsorbing the above water-soluble coumarin compound or a salt thereof. Examples of the hydrophilic polymer include, but not particularly limited to, a poly vinyl alcohol resin, an amylose resin, a starch resin, a cellulose resin, and a polyacrylate resin. Among such resins, a polyvinyl alcohol resin or a derivative thereof is preferable in view of adsorption of the dye such as the water-soluble coumarin compound, workability, and orientation. Any derivative of polyvinyl alcohol resin commonly known in the art can be used. Examples thereof include, but are not limited to, a modified polyvinyl alcohol resin made by copolymerizing vinyl alcohol with an unsaturated carboxylic acid such as crotonic acid, acrylic acid, methacrylic acid, and maleic acid; an unsaturated sulfonic acid such as vinyl sulfonic acid, acrylate sulfonic acid, methacryl sulfonic acid, p-styrene sulfonic acid, 2-acrylamido-2-methylpropanesulfonic acid, and (meth)acryloyloxyethyl sulfonic acid; or an olefin such as ethylene and propylene. The shape of the substrate is not particularly limited but, for example, the substrate can be in any shape of a film, a sheet, a flat plate, a curved plate, a hemisphere, and others. The thickness of the substrate is usually 10 μm to 100 μm, and preferably 20 μm to 80 μm. The substrate may contain one or more of water-soluble coumarin compounds represented by any of the above formulas (1) to (3), or salt thereof.

In the above polarized light-emitting film, the ratio of the water-soluble coumarin compound or salt thereof contained in the substrate is suitably adjusted so as to fall within the preferred range described below, but is not particularly limited. The polarizing performance of the polarized light-emitting film varies dependent on not only the ratio of the coumarin compound contained in the polarized light-emitting film, but also various factors such as the degree of swelling of the substrate on which the compound is adsorbed, the stretching ratio, the staining time, the staining temperature, the pH during staining, and the effect of salt. Therefore, the ratio of the coumarin compound contained in the polarized light-emitting film can be determined according to the degree of swelling of the substrate, the temperature, time and pH during staining, the type of salt, the salt concentration, and even the stretching ratio. Such ratios can be appropriately adjusted based as described later.

The above polarized light-emitting film may further contain one or more organic dyes or fluorescent dyes other than the water-soluble coumarin compound represented by any of the above formulas (1) to (3), or a salt thereof, for the purpose of adjusting the transmittance, emission color, and others, as long as the polarized light-emitting function of the polarized light-emitting film is not impaired. The other organic dyes or fluorescent dyes are not particularly limited, but preferable is a dye having high dichroism or emission luminance and having little effect on the polarized light-emitting function of the compound represented by any of the formulas (1) to (3) or a salt thereof. Examples of such dyes include C. I. Direct. Yellow 12, C. I. Direct. Yellow 28, C. I. Direct. Yellow 44. C. I. Direct. Orange 26, C. I. Direct. Orange 39. C. I. Direct. Orange 71, C. I. Direct. Orange 107, C. I. Direct. Red 2, C. I. Direct. Red 31, C. I. Direct. Red 79, C. I. Direct. Red 81, C. I. Direct. Red 247, C. I. Direct. Blue 69, C. I. Direct. Blue 78, C. I. Direct. Green 80, and C. I. Direct. Green 59. These organic dyes may be in the form of a free acid, an alkali metal salt (for example, a sodium salt, a potassium salt, and a lithium salt), an ammonium salt, or an amine salt.

When other organic dyes or fluorescent dyes as mentioned above are to be contained, different types of dye are used depending on the applications, such as a polarized light-emitting film of which a desired hue is neutral gray, a polarized light-emitting film having a polarizing function at a specific wavelength (for example, a color polarized light-emitting film for liquid crystal projectors), or other color polarized light-emitting films used in sunglasses and the like. Therefore, the ratio of the other organic dyes is not particularly limited, but generally, it is preferable that these dyes as a whole be contained in an amount within a range of 0.01 to 10 parts by mass, per 1 part by mass of the coumarin compound represented by any of the above formulas (1) to (3) or a salt thereof.

<Method for Producing Polarized Light-Emitting Film>

The method for producing the above polarized light-emitting film is described below. The method for producing the polarized light-emitting film according to the present invention mainly includes, but is not limited to, a step of providing a substrate; a step of immersing the substrate in a swelling solution to stretch the substrate by swelling; a step of impregnating the swollen substrate with a staining solution containing at least one water-soluble coumarin compound represented by any of the above formulas (1) to (3), or a salt thereof, and optionally, other organic dyes or fluorescent dyes (hereinafter also collectively referred to as "polarizing dyes") so as for the polarizing dyes to be adsorbed into the substrate; a step of immersing the substrate after adsorbing in a solution containing boric acid, and cross-linking the polarizing dyes in the substrate; a stretching step of uniaxially stretching the substrate with cross-linked polarizing dyes in a certain direction to orient the polarizing dye in a certain direction; optionally a washing step of washing the stretched substrate with a washing liquid; and optionally a drying step of drying the washed substrate.

(Providing Substrate)

Provided is a substrate for containing the water-soluble coumarin compound represented by any of the above formulas (1) to (3), or a salt thereof, and optionally, other organic dyes or fluorescent dyes. The substrate may be, for example, a commercially available film made of polyvinyl alcohol resin or a derivative thereof, or it may be produced by forming a film of polyvinyl alcohol resin. The method for forming a film of polyvinyl alcohol resin is not particularly limited, and for example, a known film forming method can be employed, such as a method of melt-extruding aqueous polyvinyl alcohol, a film forming method by flow casting, a wet film forming method, a gel film forming method (an aqueous polyvinyl alcohol solution is cooled to a gel, and then the solvent is extracted and removed), a cast film forming method (an aqueous polyvinyl alcohol solution is poured onto a substrate and dried), and a combination of these methods.

(Swelling Step)

Next, the substrate described above is subjected to a swelling treatment. The swelling treatment is preferably performed by immersing the substrate in a swelling solution at 20 to 50° C. for 30 seconds to 10 minutes, and the swelling solution is preferably water. The stretching ratio of the substrate by the swelling solution is preferably adjusted to 1.00 to 1.50, and more preferably adjusted to 1.10 to 1.35.

(Polarizing Dye-Adsorbing/Impregnating Step)

Then, at least one polarizing dye containing the above water-soluble coumarin compound or salt thereof is adsorbed into the substrate obtained by the swelling treatment as described above, and impregnated the substrate with the dye. The method for implementation of this step is not particularly limited as long as it enables adsorbing the polarizing dye onto the substrate and impregnating the substrate with the dye, and for example, it is preferable to immerse the substrate in a staining solution (aqueous staining solution) containing the polarizing dye. It can also be adsorbed by applying the staining solution to the substrate. The concentration of the polarizing dye in the staining solution is not particularly limited as long as the polarizing dye is sufficiently adsorbed onto the substrate, but is preferably 0.0001 to 3% by mass, more preferably 0.001 to 1% by mass in the staining solution, for example.

The temperature of the above staining solution in the polarizing dye-adsorbing/impregnating step is preferably 5 to 80° C., more preferably 20 to 50° C., and particularly preferably 40 to 50° C. The time of immersion of the substrate in the staining solution can be adjusted as appropriate, and is preferably adjusted between 30 seconds to 20 minutes, more preferably between 1 to 10 minutes.

As the polarizing dye contained in the above staining solution, the water-soluble coumarin compound represented by any of the above formulas (1) to (3), or a salt thereof may be used alone, or two or more of them may be used in combination. Since the water-soluble coumarin compounds represented by any of the above formulas (1) to (3), or the salts thereof have different emission colors, the emission color produced can be adjusted as appropriate to the desired color by incorporating two or more of these compounds in the substrate. If necessary, the staining solution may also further contain one or more of the other organic dyes or fluorescent dyes mentioned above.

In addition to the above polarizing dye, the above staining solution may further contain a staining aid if necessary. Examples of the staining aid include sodium carbonate, sodium bicarbonate, sodium chloride, sodium sulfate (mirabilite), anhydrous sodium sulfate, and sodium tripolyphosphate, and it is preferably sodium sulfate. The content of the staining aid can be adjusted arbitrarily depending on the time of the above immersion and the temperature of the staining solution according to the staining properties of the polarizing dye used, but it is preferably 0.1 to 10% by mass, more preferably 0.1 to 2% by mass in the staining solution.

After the polarizing dye-adsorbing/impregnating step, a pre-washing step can optionally be performed in order to remove the staining solution adhering to the surface of the substrate in this step. By performing the pre-washing step, it is possible to suppress the migration of the organic dyes remaining on the surface of the substrate into a solution in the next treatment. In the pre-washing step, water is generally used as the washing liquid. The washing method preferably comprises immersing the stained substrate in a washing liquid. Alternatively, a washing liquid can be applied to the substrate for washing. The washing time is not particularly limited, but is preferably 1 to 300 seconds, and more preferably 1 to 60 seconds. The temperature of the washing liquid in the pre-washing step needs to be a temperature at which the material constituting the substrate does not dissolve, and the washing treatment is generally performed at 5 to 40° C. Even if the pre-washing step is not performed, no significant impact is made on the performance of the polarized light-emitting film, and therefore the pre-washing step can also be omitted.

(Cross-Linking Step)

After the polarizing dye-adsorbing/impregnating step or the pre-washing step, the polarizing dye in the substrate can be cross-linked. The method for cross-linking the polarizing dye in the substrate preferably includes immersing the substrate in a treatment solution containing a cross-linking agent. However, the treatment solution may be applied to the substrate, or the substrate may be coated with the treatment solution. As a treatment solution, it is preferable to use a solution containing boric acid. The solvent in the treatment solution is not particularly limited, but water is preferable. The concentration of the boric acid in the treatment solution is preferably 0.1 to 15% by mass, and more preferably 0.1 to 10% by mass. The temperature of the treatment solution is preferably 30 to 80° C., and more preferably 40 to 75° C. The treatment time for this cross-linking step is preferably 30 seconds to 10 minutes, and more preferably 1 to 6 minutes. In a preferred embodiment of the present invention, the method for producing the polarized light-emitting film includes this cross-linking step, whereby the resulting polarized light-emitting film emits polarized light with a high luminance and a high degree of polarization. This is a remarkable effect that is completely unexpected from the function of boric acid, which was used in prior art to improve water resistance or light transmission. In addition, in the cross-linking step, a fixing treatment may further be performed with an aqueous solution containing a cationic polymer compound, if necessary. The fixing treatment allows the fixation of the polarizing dye. For this case, examples of the cationic polymer compound used include a polycondensate of dicyanamide and formalin as a cationic dicyan compound; a polycondensate of dicyandiamide and diethylenetriamine as a cationic polyamine compound; and an addition polymer of epichlorohydrin and dimethylamine, a copolymer of dimethyldiallylammonium chloride and dioxide ion, a polymer of a diallylamine salt, a polymer of dimethyldiallylammonium chloride, a polymer of an allylamine salt, and a polymer of dialkylaminoethyl acrylate quaternary salt, as a polycationic compound.

(Stretching Step)

A stretching step is carried out after performing the cross-linking step. The stretching step is performed by uniaxially stretching the substrate in a given direction. The stretching method may be either wet stretching or dry stretching. The stretching ratio is preferably 3 or more and less than 10, and more preferably 5 to 9.

In the dry stretching method, if the stretching/heating medium is an air medium, it is preferable to stretch the substrate with the temperature of the air medium set at normal temperature to 180° C. It is preferably in an atmosphere with a humidity of 20 to 95% RH. The method for heating the substrate includes roll-to-roll zone stretching, roll heat stretching, hot rolling stretching, and infrared heat stretching, but is not limited to these stretching methods. The dry stretching step may be performed in a single stage stretching, or a multistage stretching of two or more stages.

In the wet stretching method, it is preferable to stretch the substrate in water, a water-soluble organic solvent, or a mixed solution thereof. More preferably, the stretching treatment is performed while immersing the substrate in a solution containing at least one cross-linking agent. As the cross-linking agent, boric acid in the above cross-linking agent step can be used, for example, and preferably, the stretching treatment can be performed in the treatment solution used in the cross-linking step. The stretching temperature is preferably 40 to 70° C., and more preferably 45 to 60° C. The stretching time is usually 30 seconds to 20 minutes, and preferably 2 to 7 minutes. The wet stretching step may be performed in a single stage stretching, or a multistage stretching of two or more stages. The stretching treatment may optionally be performed before the polarizing dye-adsorbing/impregnating step, and in this case the dye orientation can be performed simultaneously at the time of staining.

(Washing Step)

After carrying out the stretching step, the cross-linking agent may precipitate or foreign matter may adhere on the surface of the substrate. Therefore, a washing step of washing the surface of the substrate can be performed. The washing time is preferably 1 second to 5 minutes. The washing method preferably comprises immersing the substrate in a washing liquid. Alternatively, a washing liquid may be applied to or coated on a substrate for washing. As the washing liquid, water is preferable. The washing treatment may be performed in a single stage, or a multistage of two or more stages. The temperature of the washing liquid during the washing step is not particularly limited, but it is usually 5 to 50° C., preferably 10 to 40° C., and may be at normal temperature.

Examples of the solvent for the solutions or treatment solutions used in each of the steps mentioned above include, in addition to the water mentioned above, dimethyl sulfoxide, N-methylpyrrolidone, an alcohol such as methanol, ethanol, propanol, isopropyl alcohol, glycerin, ethylene glycol, propylene glycol, diethylene glycol, triethylene glycol, tetraethylene glycol, and trimethylolpropane, and an amine such as ethylenediamine and diethylenetriamine. The solvent for the solutions or treatment solutions is not limited thereto, but is most preferably water. These solvents for the solutions or treatment solutions may be used singly, or a mixture of two or more solvents may be used.

(Drying Step)

A step of drying the substrate is performed after the washing step. The drying treatment can be performed by natural drying. To increase the drying efficiency, it can be performed by roll compression, removal of surface moisture with an air knife or a water-absorbing roll, or the like, and air blast drying can also be performed. The temperature for the drying treatment is preferably 20 to 100° C., and more preferably 60 to 100° C. The drying time is preferably 30 seconds to 20 minutes, and more preferably 5 to 10 minutes.

A polarized light-emitting film can be produced according to the methods exemplified above. Polarized light-emitting films of various colors, for example, neutral gray, can be produced by orienting the water-soluble coumarin compound represented by any of the formulas (1) to (3), or a salt thereof, by a method involving mixing it with a liquid crystal and orienting, or by a coating method involving sharing.

[Polarized Light-Emitting Plate]

The polarized light-emitting plate containing the above polarized light-emitting film is also included in the present claimed invention.

In a preferred embodiment of the present invention, the polarizing light-emitting plate includes a transparent protective layer along with the above polarized light-emitting film, and typically has a transparent protective layer on at least one side of the above polarized light-emitting film. The transparent protective layer is used to enhance the water resistance, handleability, and the like of the polarized light-emitting film. Therefore, the transparent protective layer preferably does not affect in any way the polarized light-emitting function exhibited by the polarized light-emitting film.

The above transparent protective layer is preferably a transparent protective layer with excellent optical transparency and mechanical strength. The transparent protective layer preferably has the shape of a layer capable of retaining the shape of the polarized light-emitting film. The transparent protective layer is also preferably excellent in thermal stability, moisture shielding, and others in addition to transparency and mechanical strength. Examples of the material to form such a transparent protective layer include a cellulose acetate film, an acrylic film, a fluorine film such as a tetrafluoroethylene/hexafluoropropylene copolymer, a polyester resin, a polyolefin resin and a polyamide resin, and preferably, a triacetyl cellulose (TAC) film or a cycloolefin film is used. The thickness of the transparent protective layer is preferably in the range of 1 μm to 200 μm, more preferably 10 μm to 150 μm, and particularly preferably 40 μm to 100 μm. The polarized light-emitting plate with a transparent protective layer can be produced, for example, but not particularly limited to, by superposing the transparent protective layer on the polarized light-emitting film and laminating using a known formulation.

The above polarized light-emitting plate may further include an adhesive layer between the transparent protective layer and the polarized light-emitting film to bond the transparent protective layer to the polarized light-emitting film. The adhesive forming the adhesive layer is not particularly limited. Examples thereof include a polyvinyl alcohol adhesive, a urethane emulsion adhesive, an acrylic adhesive, and a polyester isocyanate adhesive, and preferably, a polyvinyl alcohol adhesive is used. After bonding the transparent protective layer and the polarized light-emitting film with an adhesive, a drying or heat treatment at an appropriate temperature can be performed to produce the polarized light-emitting plate.

The above polarized light-emitting plate may also include various known functional layers such as an anti-reflective layer, an anti-glare layer, and an additional transparent protective layer, as appropriate, and theses layers are typically provided on the exposed surface of the transparent protective layer. For producing such layers having various functionalities, a method including coating the exposed surface of the transparent protective layer with a material having various functionalities, for example, is preferable. It is also possible to bond the layer or film having such a function to the exposed surface of the transparent protective layer, for example, via an adhesive or a pressure sensitive adhesive.

Examples of the above additional transparent protective layer include an acrylic, urethane, and polysiloxane hard coat layers. An anti-reflective layer can also be provided on the exposed surface of the transparent protective layer to further enhance the single transmittance. The anti-reflective layer can be formed, for example, by vapor deposition or sputtering treatment of a substance such as silicon dioxide or titanium oxide on the exposed surface of the transparent protective layer, or by thinly coating the exposed surface of the transparent protective layer with a fluorinated substance.

The above polarized light-emitting plate can further include a support, if necessary. Such a support preferably has a flat part to attach the polarized light-emitting plate thereto. In view of optical applications, it is preferably transparent. Transparent supports can be divided into inorganic supports and organic supports. Examples of inorganic supports include supports made of an inorganic material such as soda glass, borosilicate glass, quartz, sapphire, and spinel. Examples of organic supports include supports made of an organic material such as acrylic, polycarbonate, polyethylene terephthalate, polyethylene naphthalate, and cyclo olefin polymers. The thickness and size of the support are not particularly limited and can be determined as appropriate. For the polarized light-emitting plate with a support, it is preferable to provide an anti-reflective layer on one or both of the surface of the support and the surface of the polarized light-emitting plate to further enhance the single transmittance. In order to adhere the polarized light-emitting plate to the flat part of the support, a transparent (pressure sensitive) adhesive can be coated on the flat part of the support, and then the polarized light-emitting plate can be attached to this coated surface. The adhesive or pressure sensitive adhesive to be used is not particularly limited, and commercially available products can be used, with acrylic ester adhesives or pressure sensitive adhesives being preferable.

The above polarized light-emitting plate can also be made into a circular polarized light-emitting plate or an elliptical polarized light-emitting plate by attaching a retardation plate. For example, in a case where a support is further provided on the polarized light-emitting plate, these circular or elliptical polarized light-emitting plates can be produced if the support is a retardation plate. Examples of the retardation plate generally include, but are not limited to, those having a phase difference value of ¼ λ or those having a phase difference value of ½ λ relative to the absorption or emission wavelength of light. When the phase difference value is ¼λ, the resulting polarized light-emitting plate can function as a circular polarizing plate or a circular polarized light-emitting plate for that wavelength, and when the phase difference value is ½λ, the resulting polarized light-emitting plate can convert the polarization to a direction of 90° when use. Thus, various functional layers, supports, and the like can be further provided on the polarized light-emitting plate, and such polarized light-emitting plate can be used for various products, such as liquid crystal projectors, calculators, watches, laptop computers, word processors, liquid crystal televisions, car navigation systems, indoor and outdoor measuring devices and indicators, lenses, or glasses.

In a preferred embodiment of the present invention, the polarized light-emitting film and the polarized light-emitting plate exhibit a high polarized light-emitting effect and a high transmittance in the visible light region, as well as a polarizing function in the ultraviolet light region or visible light region. In addition, the polarized light-emitting film and the polarized light-emitting plate exhibit excellent durability against, for example, heat, humidity, and light, and therefore they are capable of retaining their performance even in harsh environments, and have higher durability than conventional iodine polarizing plates. Thus, the polarized light-emitting film and the polarized light-emitting plate according to a preferred embodiment of the present invention can be applied to various display devices such as liquid crystal displays, which require high transmittance in the visible light region and high durability in harsh environments, for example, televisions, wearable devices, tablet devices, smartphones, in-car monitors, digital signage used outdoor or indoor, and smart windows.

[Display Device]

A display device containing the above polarized light-emitting film or polarized light-emitting plate is also included in the present invention.

In the embodiments of the present invention, the display device exhibits a polarized light-emitting effect when irradiated with light in the ultraviolet to visible light region, for example, light of 300 to 600 nm, and thus displaying is enabled by utilizing this effect. Since the display device according to the embodiments of the present invention also has a high transmittance in the visible light region, there is no reduction in the transmittance in the visible light region as with conventional polarizing plates, or even if there is a reduction in transmittance, the reduction in transmittance is significantly smaller than with conventional polarizing plates. Conventional polarizing plates, for example, iodine polarizing plates or dye-containing polarizing plates containing other dye compounds, have a visibility corrected transmittance of about 35 to 45%. The reason for this is that conventional polarizing plates have both a vertical and horizontal axis as absorption axes of light, and absorb incident light on either the vertical or horizontal axis. That is, polarized light is generated by absorbing light in one axis and transmitting light in the other axis. In such case, the light on one axis is absorbed and not transmitted, which inevitably results in a transmittance of 50% or less. In addition, conventional polarizing plates are produced by stretching a film containing a dichroic dye to orient the dichroic dye, and this production method cannot necessarily orient 100% of the dichroic dye, which results in that components that absorb slightly with respect to the light transmission axis are also contained. In addition, interfacial reflection also occurs by the surface reflection of this material. For this reason, any polarizing plate with high transmittance is not obtained. That is, it was not possible to achieve a high degree of polarization without reducing the transmittance. By contrast, the polarized light-emitting film or polarized light-emitting plate according to the embodiments of the present invention has a light absorption band around 300 to 600 nm, especially 350 to 500 nm. That is, it absorbs light in the ultraviolet light region and the visible light region on the short wavelength side, and exhibits a polarized light-emitting effect by emitting polarized light in the visible light region. However, there is little absorption in the band affecting the visibility in the visible light region, and therefore the decrease in transmittance is significantly suppressed to result in the very high transmittance in the visible light region. In addition, since it exhibits a polarized light-emitting effect in the visible light region, there is less loss of light compared to using a conventional polarizing plate and the decrease in transmittance such as in a conventional polarizing plate is very small. Therefore, the display device using a polarized light-emitting film or a polarized light-emitting plate according to the embodiments of the present invention, for example, a liquid crystal display, exhibits a higher luminance than a display device such as a liquid crystal display using a conventional polarizing plate. In addition, the display device using a polarized light-emitting film or a polarized light-emitting plate according to the embodiments of the present invention has a high transparency, and this enables, for example, a nearly transparent display even if it is a liquid crystal display. In addition, it can be designed so as to transmit polarized light emission when displaying characters, images, and the like, and this enables a display capable of displaying even if it is a transparent liquid crystal display, or in other words, enables a display in which characters and the like can be displayed on a transparent display. Thus, according to the embodiments of the present invention, the display device can be a transparent liquid crystal display with no light loss, in particular, a see-through display.

According to the embodiments of the present invention, the display device is also capable of polarizing ultraviolet light, which is invisible to the human eye, and thus can be applied to liquid crystal displays capable of displaying by ultraviolet light. For example, it is possible to produce a simple and highly secure liquid crystal display in which images and the like displayed by light in the ultraviolet region are recognized by, for example, a computer and are thus visible only when irradiated with ultraviolet light.

The above display device exhibits a polarized light-emitting effect when irradiated with ultraviolet light, and it is possible to produce a liquid crystal display using that polarized light emission. Thus, it is also possible to realize a liquid crystal display using ultraviolet light instead of the usual liquid crystal display using visible light. This means that it is possible to produce a light-emitting liquid crystal display on which characters, images, and the like are displayed even in a dark space with no light as long as the space can be irradiated with ultraviolet light.

Furthermore, since the light absorption band differs between the visible light region and the ultraviolet light region, it is also possible to produce a display in which a liquid crystal display portion capable of displaying by light in the visible light region coexists with a liquid crystal display portion with light displayed by the polarized light-emitting effect of ultraviolet light. Although displays capable of two different displays have existed in the past, there is no display capable of different displays using different light sources in the ultraviolet and visible light regions even on the same liquid crystal panel. Therefore, incorporating the above polarized light-emitting film or polarized light-emitting plate enables the production of the display device according to the present invention as a novel display.

In the liquid crystal display according to the embodiments of the present invention, the liquid crystal cell may be, for example, a TN liquid crystal cell, an STN liquid crystal cell, a VA liquid crystal cell, and an IPS liquid crystal cell, but is not limited thereto, and the liquid crystal display can be used in any liquid crystal display mode. Since the polarized light-emitting film or the polarized light-emitting plate containing the above water-soluble coumarin compound or a salt thereof has high durability, it can also be used in a liquid crystal display for in-car or outdoor display, or the like.

In the embodiments of the present invention, the polarized light-emitting plate also includes a neutral gray polarizing plate. The neutral gray polarizing plate has an excellent polarized light-emitting performance and, furthermore, has the characteristic of not causing discoloration or a decrease in the polarizing performance even under high temperatures and high humidity conditions in the car or outdoors.

EXAMPLES

Hereafter, the present invention will be described in more detail by way of examples, which are illustrative only and do not limit the present invention in any way. In the following, "%" and "part" are by mass unless otherwise specified. For the synthesized compounds for which λmax (maximum absorption wavelength) was measured, the found values shown are those on an aqueous solution at pH 7 to 8. In each structural formula of the compounds used in each Example and Comparative Example, the acidic functional groups such as the sulfo groups are shown in the form of free acids.

Example 1

Synthesis of Water-Soluble Coumarin Compound: Synthesis Example 1

3.3 parts of commercially available 3-(2-benzoimidazolyl)-7-(diethylamino)coumarin was added to a mixed solution of 45 parts of 98% sulfuric acid and 10 parts of 30% fuming sulfuric acid, and the mixture was stirred at 25° C. for 24 hours. The resulting reaction solution was added to 300 parts of water, and the precipitated solid was separated by filtration and further washed with 100 parts of acetone to obtain 10.0 parts of wet cake. This wet cake was dried in a hot air dryer at 80° C. In this way, 3.0 parts of the water-soluble coumarin compound represented by the following formula (5) was synthesized.

[Formula 5]

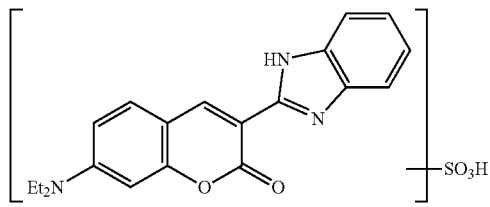

(5)

(Production of Polarized Light-Emitting Film and Polarized Light-Emitting Plate)

A 75-μm-thick polyvinyl alcohol film (VF-PS #7500 manufactured by Kuraray) was immersed in water at 40° C. for 3 minutes to swell the film. The film obtained by selling was immersed in an aqueous solution at 45° C. containing 1.0 part of the water-soluble coumarin compound of the above formula (5) obtained in Synthesis Example 1, 1.0 part of mirabilite, and 1,000 parts of water for 3 minutes to impregnate the film with the coumarin compound of formula (5). The film containing the water-soluble coumarin compound of formula (5) was immersed in a 3% boric acid aqueous solution at 50° C. for 5 minutes to stretch it to a stretching ratio of 5. The stretched film was rinsed with water at normal temperature for 20 seconds while maintaining a state of tension, and then dried to produce a polarized light-emitting film. A triacetyl cellulose film (ZRD-60 manufactured by Fujifilm) (thickness: 60 μm) free of ultraviolet light absorbers was laminated on both sides of the obtained polarized light-emitting film using a polyvinyl alcohol adhesive (an aqueous solution of 4 parts by weight of NH-26 manufactured by JAPAN VAM & POVAL and 100 parts by weight of water) to produce a polarized light-emitting plate. This polarized light-emitting plate was used as the measurement sample for Example 1.

Example 2

Synthesis of Water-Soluble Coumarin Compound: Synthesis Example 2

Except that 3.5 parts of commercially available 3-(2-benzothiazolyl)-7-(diethylamino)coumarin was used instead of 3.3 parts of 3-(2-benzoimidazolyl)-7-(diethylamino)coumarin in the above Synthesis Example 1, the same operations as in Synthesis Example 1 were performed to synthesize 2.9 parts of the water-soluble coumarin compound according to the present invention represented by the following formula (6).

[Formula 6]

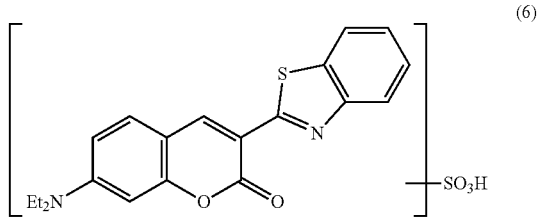

(6)

(Production of Polarized Light-Emitting Film and Polarized Light-Emitting Plate)

Next, using the water-soluble coumarin compound represented by the above formula (6), the same operations as in Example 1 were performed to produce a polarizing light-emitting plate. This polarized light-emitting plate was used as the measurement sample for Example 2.

Example 3

A polarized light-emitting plate according to the present invention was produced in the same manner, except that the immersion time was changed from 3 minutes to 1 minute in the step of impregnating the film with the water-soluble coumarin compound of the above formula (5) by immersing the swollen polyvinyl alcohol film in an aqueous solution at 45° C. containing the water-soluble coumarin compound of formula (5) in the production of the polarized light-emitting film of the above Example 1. This polarized light-emitting plate was used as the measurement sample for Example 3.

Comparative Example 1

Except that C.I. Direct Yellow 4 shown in the following formula (7) was used instead of the water-soluble coumarin compound represented by the above formula (5) in the above Example 1, the same operations as in Example 1 were performed to produce a measurement sample.

[Formula 7]

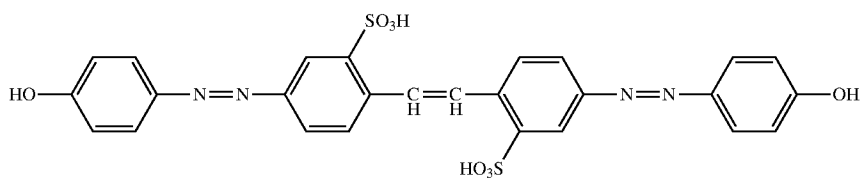

(7)

Comparative Example 2

Except that the compound shown in the following formula (8) was used instead of the water-soluble coumarin compound represented by the above formula (5) in the above Example 1, the same operations as in Example 1 were performed to produce a measurement sample.

[Formula 8]

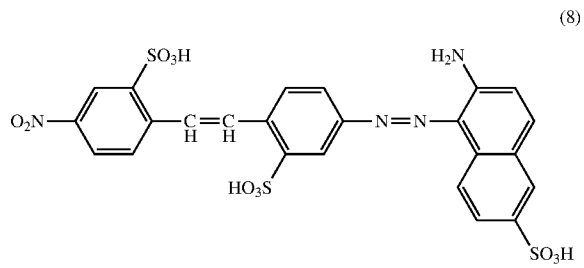

(8)

Comparative Example 3

Except that C.I. Direct Orange 39, which has a wavelength of maximum absorption at a wavelength close to that of the compound of the above formula (5), was used instead of the water-soluble coumarin compound represented by the above formula (5) in the above Example 1, the same operations as in Example 1 were performed to produce a measurement sample.

[Evaluation]

The evaluation of each measurement sample obtained in Examples 1 to 3 and Comparative Examples 1 to 3 was performed as follows.

(a) Measurement of Single Transmittance (Ts), Parallel Transmittance (Tp), and Cross Transmittance (Tc)

The single transmittance Ts, parallel transmittance Tp, and cross transmittance Tc of each measurement sample were measured using a spectrophotometer ("U-4100" manufactured by Hitachi). Here, the single transmittance Ts is the transmittance at each wavelength when the measurement was made on a single measurement sample. The parallel transmittance Tp is the spectral transmittance at each wavelength measured by providing two identical measurement samples obtained in each Example and Comparative Example, and overlapping these two measurement sample so that the directions of their absorption axes are parallel. The cross transmittance Tc is the spectral transmittance measured by overlapping two measurement sample so that their absorption axes are orthogonal. The measurement of each transmittance was performed over a wavelength band of 220 to 780 nm.

(b) Calculation of Degree of Polarization ρ

The degree of polarization ρ of each measured sample was calculated by plugging the parallel transmittance Tp and cross transmittance Tc in the following formula (I). The higher the value of ρ, the better the degree of polarization.

[Expression 1]

$$\rho = \{(Tp-Tc)/(Tp+Tc)\}^{1/2} \times 100 \qquad \text{Expression(I)}$$

(c) Visibility-Corrected Single Transmittance Ys and Visibility-Corrected Degree of Polarization ρy The visibility-corrected single transmittance Ys of each measurement sample is the transmittance corrected for visibility according to JIS Z 8722:2009 for the above single transmittance Ts obtained at predetermined wavelength intervals d (here, 5 nm) in the wavelength region of 400 to 700 nm in the visible light region. Specifically, it was calculated by plugging the above single transmittance Ts in the following formula (II). In the following formula (II). Pλ represents the spectral distribution of a standard light (light source C), and yλ represents a color-matching function with a 2-degree field of view. The visibility-corrected degree of polarization ρy was measured using values calculated by a spectrophotometer ("U-4100" manufactured by Hitachi).

[Expression 2]

$$Y_S = \frac{\int_{400}^{700} P\lambda \cdot y\lambda \cdot Ts \cdot d\lambda}{\int_{400}^{700} P\lambda \cdot y\lambda \cdot d\lambda} \qquad \text{Expression (II)}$$

(d) Measurement of Polarized Light Emission

The polarized light emission intensity and degree of polarization of the emitted light for each measurement sample were measured by the commonly known Stokes parameter method using an emission spectrophotometer (Spectroscopic polarimeter Poxi-Spectra manufactured by Tokyo Instruments). In the emission intensity (S0) obtained from the emission spectrophotometer when light of 375 nm was incident on the measurement sample, the emission intensity at the wavelength for the maximum emission was regarded as 1, and the ratios for each wavelength were calculated. Then the intensity ratio (Sr0) for each wavelength and the degree of linear polarization (DOLP) of the emitted light obtained from the spectrophotometer were used to calculate the degree of polarization (DOP) based on the light emission using the formula (III).

[Expression 3]

$$DOP = Sr0 \times DOLP \qquad \text{Expression(III)}$$

Table 1 below shows the single transmittance (Ts), parallel transmittance (Tp), cross transmittance (Tc), and degree of polarization (ρ), as well as the single transmittance corrected for visibility (Ys) and the degree of polarization corrected for visibility (ρy) at the wavelength for the maximum degree of polarization of each of the measurement samples obtained in Examples 1 to 3 and Comparative Examples 1 to 3. The units for each of the above ratios and degree are in percent.

TABLE 1

| | Wavelength for Maximum Degree of Polarization (nm) | Ts (%) | Tp (%) | Tc (%) | ρ (%) | Ys (%) | ρy (%) |
|---|---|---|---|---|---|---|---|
| Example 1 | 456 | 43.34 | 26.97 | 10.604 | 65.99 | 86.63 | 9.09 |
| Example 2 | 458 | 42.81 | 27.50 | 9.151 | 39.87 | 89.82 | 3.65 |
| Example 3 | 456 | 60.36 | 41.15 | 31.712 | 35.99 | 88.65 | 6.08 |
| Comparative Example 1 | 406 | 43.27 | 35.73 | 1.720 | 95.30 | 87.90 | 9.40 |
| Comparative Example 2 | 408 | 43.39 | 37.39 | 0.27 | 99.28 | 88.90 | 9.97 |
| Comparative Example 3 | 450 | 35.22 | 20.75 | 4.060 | 82.02 | 77.39 | 24.09 |

FIG. 1 shows a graph of the DOP values at each wavelength for the measurement samples obtained in Examples 1 to 3 and Comparative Example 1. As shown in FIG. 1, the measured samples obtained in Examples 1 to 3 each show high DOP values around 510 nm, indicating an emission of polarized light. On the other hand, the measured sample obtained in Comparative Example 1 has a significantly low DOP and exhibits no polarized light emission. The DOP of Comparative Example 2 and Comparative Example 3 did not exhibit polarized light emission as in Comparative Example 1.

Table 2 below shows the wavelength for the highest DOP value and the DOP value for the measurement samples obtained in Examples 1 to 3.

TABLE 2

| | Wavelength for Maximum Polarized Light Emission (nm) | DOP |
|---|---|---|
| Example 1 | 514 | 0.785 |
| Example 2 | 514 | 0.804 |
| Example 3 | 515 | 0.848 |

As shown in Table 1 above, the samples of Examples 1 to 3, which were produced using a water-soluble coumarin compound having the structure of the above formula (1), have a polarized light-emitting function in the visible light region and function as polarized light-emitting films (polarized light-emitting plates) in the same region. In addition, the samples of Examples 1 to 3 have a transmittance in the visible light region (visibility-corrected transmittance Ys) of 85% or higher, indicating that they are polarized light-emitting plates (polarized light-emitting films) having a high transmittance in the visible light region while having a polarizing function in the same region. Furthermore, as shown in FIG. 1, the measurement samples of Examples 1 to 3 have high DOP values in the wavelength region of 450 to 600 nm and have the highest DOP around 510 nm, indicating that they emit light over a wide wavelength band in the visible light region and that their light emission is polarized, i.e., they have a polarized light-emitting effect. In addition, their DOP values showed high values regardless of the transmittance (Ts) and degree of polarization (p), indicating that they emit light having polarization independent of the absorption anisotropy of the light. On the other hand, the DOP values for the measurement samples of Comparative Examples 1 to 3 were extremely low at each wavelength. This indicates that no polarized light-emitting effect is exhibited even when using dichroic dyes used in conventional dye-containing polarizing plates, such as those in Comparative Examples 1 to 3.

(Durability Test)

Durability tests were conducted on the samples of Examples 1 to 3 under the following two conditions.
1) 105° C., 1000 hours
2) 60° C., 90% relative humidity, 1000 hours As a result, no change in the DOP value was observed for any of them. This indicates that the samples of Examples 1 to 3 have high durability even in harsh environments.

INDUSTRIAL APPLICABILITY

As described above, the polarized light-emitting films or the polarized light-emitting plates containing the above water-soluble coumarin compound or a salt thereof not only have a polarizing function but also exhibit a polarized light-emitting effect. In addition, such polarized light-emitting films and polarized light-emitting plates have high transmittance in the visible light region, and have excellent durability. Therefore, the display devices produced using such polarized light-emitting films or polarized light-emitting plates have high transmittance in the visible light region and can display images by polarized light emission for a long period of time, which makes them applicable to a wide range of applications such as televisions, computers, tablet devices, and even transparent displays (see-through displays). Furthermore, the polarized light-emitting film produced using the above coumarin compound or a salt thereof is capable of emitting light by ultraviolet light, and thus can also be applied to displays and media that require high security.

The invention claimed is:

1. A polarized light-emitting film comprising a water-soluble coumarin compound represented by the following formula (2):

[Formula 1]

$$[A \!\!-\!\!\!\!-\!\!(X)_n \tag{1}$$

wherein $R_2$ represents a hydrocarbon group having 1 to 10 carbon atoms, Q represents a sulfur atom, an oxygen atom, or a nitrogen atom, and n is an integer from 1 to 3, or a salt thereof.

2. The polarized light-emitting film according to claim 1, wherein Q represents a nitrogen atom and n is 1.

3. The polarized light-emitting film according to claim 1, further comprising one or more organic dyes or fluorescent dyes other than the water-soluble coumarin compound or the salt thereof.

4. The polarized light-emitting film according to claim 1, comprising the water-soluble coumarin compound or the salt thereof and, optionally, the organic dye or fluorescent dye, in a substrate made of polyvinyl alcohol resin or a derivative thereof.

5. A polarized light-emitting plate comprising the polarized light-emitting film according to claim 1 and a transparent protective layer provided on at least one side thereof.

6. A display device comprising the polarized light-emitting film according to claim 1.

7. A display device comprising the polarized light-emitting plate according to claim 5.

8. The polarized light-emitting film according to claim 2, further comprising one or more organic dyes or fluorescent dyes other than the water-soluble coumarin compound or the salt thereof.

9. The polarized light-emitting film according to claim 2, comprising the water-soluble coumarin compound or the salt thereof and, optionally, the organic dye or fluorescent dye, in a substrate made of polyvinyl alcohol resin or a derivative thereof.

10. The polarized light-emitting film according to claim 3, comprising the water-soluble coumarin compound or the salt thereof and, optionally, the organic dye or fluorescent dye, in a substrate made of polyvinyl alcohol resin or a derivative thereof.

11. A polarized light-emitting plate comprising the polarized light-emitting film according to claim 2 and a transparent protective layer provided on at least one side thereof.

12. A polarized light-emitting plate comprising the polarized light-emitting film according to claim 3 and a transparent protective layer provided on at least one side thereof.

13. A polarized light-emitting plate comprising the polarized light-emitting film according to claim 4 and a transparent protective layer provided on at least one side thereof.

* * * * *